United States Patent [19]
Yousch

[11] 3,782,535
[45] Jan. 1, 1974

[54] SCREW CONVEYOR COIL WIPER

[76] Inventor: Thomas Yousch, 16258 Vintage, Sepulveda, Calif. 91343

[22] Filed: June 15, 1972

[21] Appl. No.: 263,343

[52] U.S. Cl. .............................. 198/229, 198/213
[51] Int. Cl. ...................... B65g 33/18, B65g 45/00
[58] Field of Search .......................... 198/229, 213; 222/404

[56] References Cited
UNITED STATES PATENTS
2,693,873  11/1954  Martin .............................. 198/213
3,580,389  5/1971  Nonnenmacher .................. 198/229

Primary Examiner—Edward A. Sroka
Attorney—E. Wallace Breisch

[57] ABSTRACT

A wiping device for cleaning the flights of a screw conveyor by having a helical wiping coil that rotates with the rotating screw and simultaneously is moved along the axis of the screw in a reciprocating motion such that the wiping coil lightly engages the entire trough of the screw between the ridges or lands of the screw flights in a reciprocating manner.

10 Claims, 6 Drawing Figures

SCREW CONVEYOR COIL WIPER

BACKGROUND OF THE INVENTION

Screw conveying, mixing, or heat exchanging devices are commonly used when working with semi-solid paste-like materials. The screw devices normally used comprise one or more helical rotating screws which move a pasty material being processed along a chute or channel means. In that the material being processed is of a pasty or sticky texture the tendency for such material to undesirably adhere to the screws causes clogging and if the screws are utilized in a heat exchanger or a dryer the adhering material may bind to the screws in a manner which will damage or stop the conveyor system. Several methods of cleaning the screws have been used, including separate scraping tools which protrude into the troughs of the screws between the flights. A popular cleaning means is the use of separate helical cleaning screws or coils which may rotate with the conveying screws within the troughs thereof. The cleaning coils heretofore utilized have not covered the entire surface of the troughs between the flights as desired, and consequently clogging may still occur.

SUMMARY OF INVENTION

According to the present invention there is provided a new and novel wiping device for cleaning the screws of a screw conveyor device by utilizing separate rotating coils which intermesh with one or more rotating screws and also move in a reciprocating manner along the axis of the screws in a manner to slidably engage the entire surface of the conveying troughs of the screws between each flight thereof as the wiping coil is moved in a reciprocating manner therebetween.

Other provisions and combinations of multiple wiping coils with multiple parallel screws used for conveying, mixing or heat exchanging will be apparent when taken in conjunction with the following detailed description and the accompanying drawings wherein.

DESCRIPTION

Figure 1:
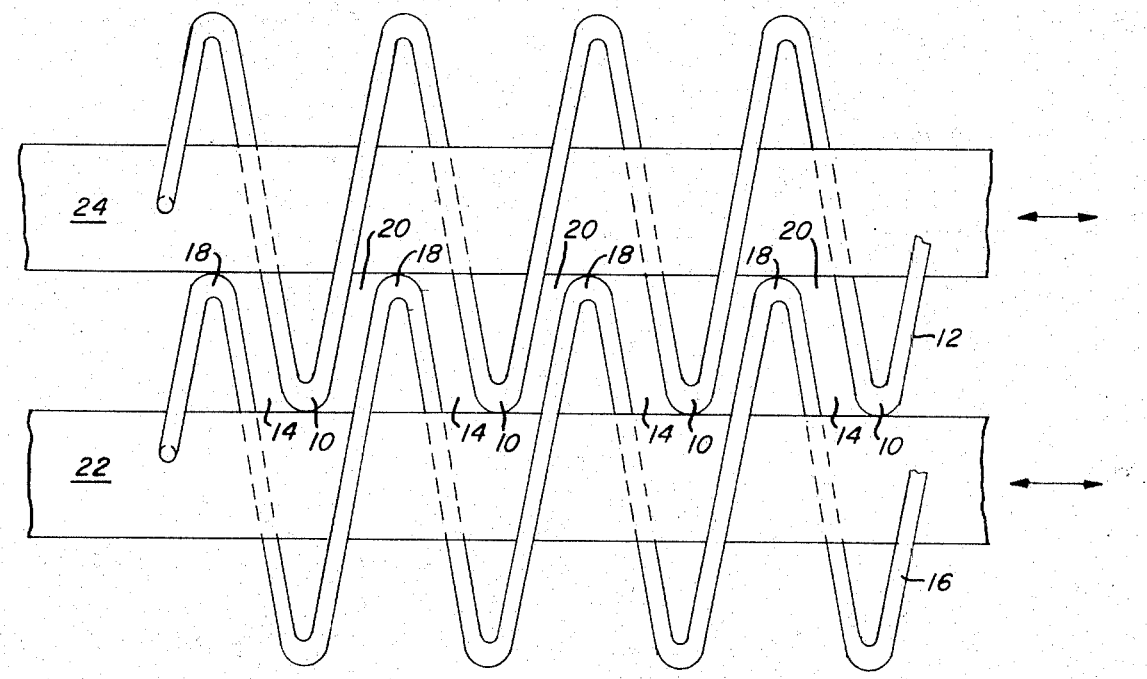
FIG. 1 is an axial view of a pair of intermeshing coil wipers showing the flights of the coils in the troughs of the opposite coil.

Referring to FIG. 1 there is shown a segment of a parallel set of helical metal coil wipers illustrating the intermeshing of the flights 10 of one coil 12 within the troughs 14 of the other coil 16 and similarly the flights 18 extending in the troughs 20 of coil 12 such that the coils not only will clean the conveyor screws (shown in FIG. 3) but will clean each other. The flights of each coil extend into the trough of the parallel coil to meet the axis or stems 22 and 24 of the respective coils 16 and 12 where a light cleaning force is applied thereto without effecting any metal to metal wear. The parallel coils 12 and 16 and those of other embodiments described hereinafter can be rotated in either co-rotational or counter-rotational motion and perform equally well while the stems are being moved together along the axis thereof in a reciprocating motion by means described hereinafter.

Figure 2:
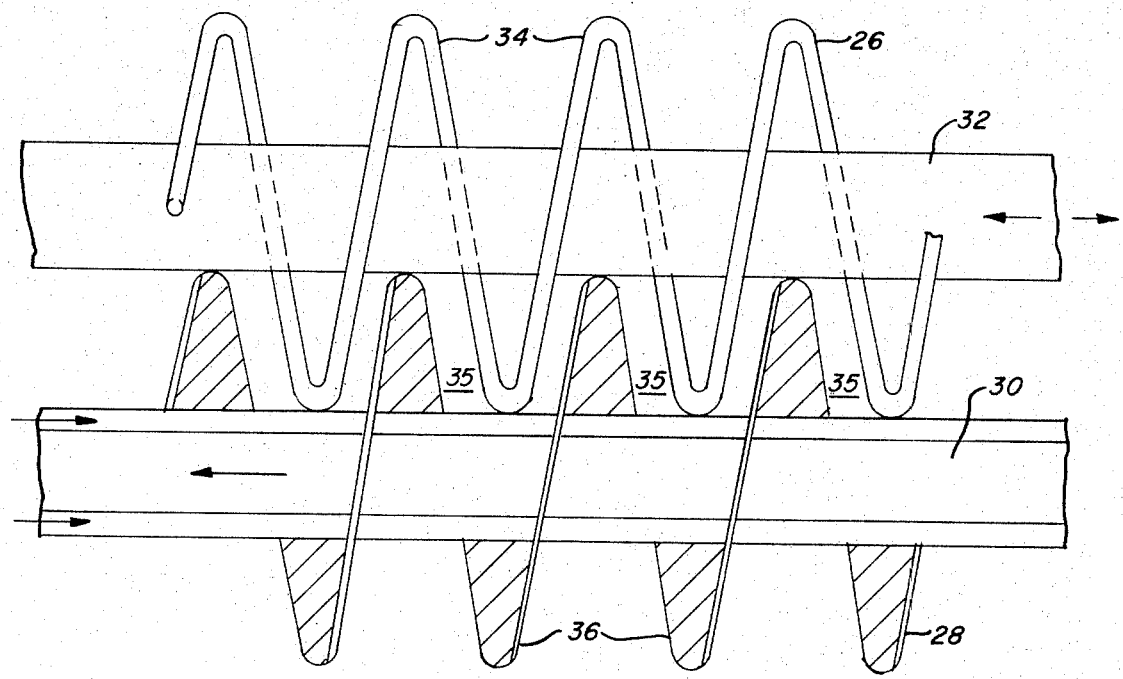
FIG. 2 is an axial view of a single coil wiper with the flights thereof extending into the trough of a single screw conveyor.

FIG. 2 shows a segment of an arrangement using a single coil wiper 26 intermeshed with a single conveyor screw 28. The conveyor screw 28 has a hollow stem pipe 30 for transmitting a heat exchanging medium therethrough for either cooling or heating the conveyed material surrounding the screw 28. The stem 32 and the flights 34 of the wiper 26 are located with respect to the screw 28 such that the flights 36 of the screw 28 lightly meet the stem 32 of the wiper 26 and the flights 34 of the wiper lightly meet the stem 30 of the screw 28 such that when the screw 28 and the wiper are both rotating they will maintain the troughs 35 of the screw clear from any clogging of the material being conveyed.

Figure 3:
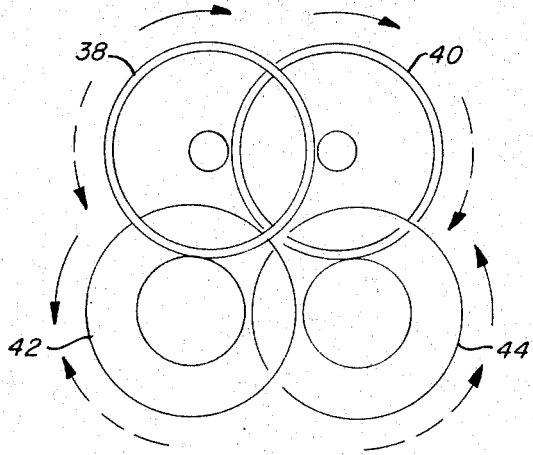
FIG. 3 is an end view of an arrangement of two parallel intermeshed conveying screws further intermeshed with two parallel intermeshed coil wipers.

FIG. 3 shows an arrangement of parallel coil wipers 38 and 40 intermeshed with each other and each individually intermeshed with one of a parallel set of conveyor screws 42 and 44 which are themselves intermeshed with each other. The material being processed is conveyed by the intermeshed rotating screws 42 and 44 while the rotating coil wiper 38 is cleaning the troughs and flights of the screw 42 and rotating coil wiper 40 is cleaning the troughs and flights of the screw 44, both wipers 38 and 40 simultaneously being intermeshed and cleaning each other.

Figure 4:
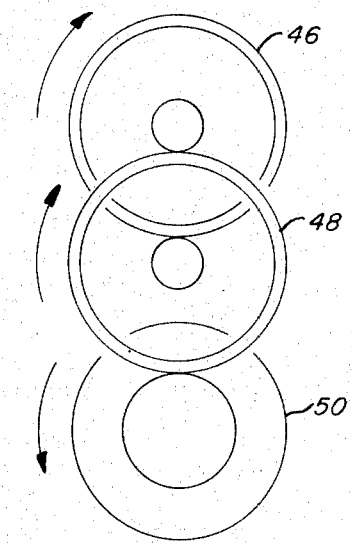
FIG. 4 is an end view of two parallel intermeshed coil wipers one of which is also intermeshed with a single conveying screw.

The embodiment shown in FIG. 4 has two parallel coil wipers 46 and 48 intermeshed and arranged such that one wiper 48 cleans a conveyor screw 50 while simultaneously the other wiper 46 cleans wiper 48.

Figure 5:
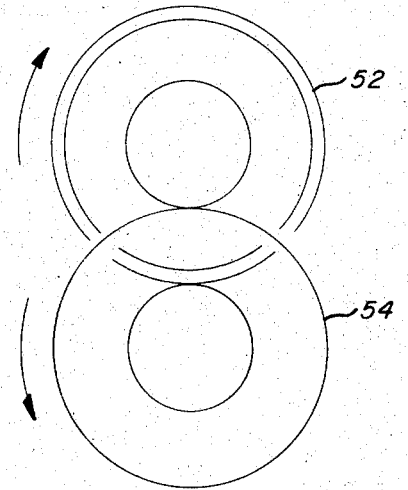
FIG. 5 is an end view of a single coil wiper intermeshed with a single conveyor screw having flights equal in length to those of the coil wiper.

The embodiment shown in FIG. 5 shows an end view of an arrangement similar to that of FIG. 2 with a single wiper coil 52 intermeshed with a single conveyor screw 54 to clean said screw 54.

Figure 6:
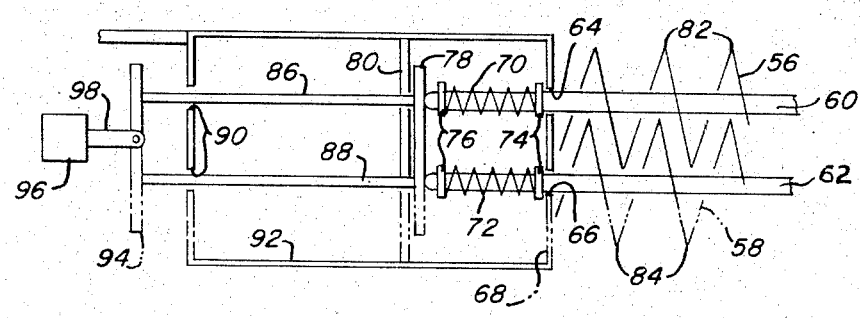
FIG. 6 is an elevational view of an arrangement for shifting the coil wipers in a reciprocating manner.

Each of the embodiments shown in FIGS. 1–5 has a reciprocating apparatus such as shown in FIG. 6 for reciprocating the respective wiper coils along the trough of the conveyor screws between each flight or land thereof. The apparatus is shown in FIG. 6 is a representation of the ends of two coil wipers 56 and 58 having stems 60 and 62 which protrude through openings 64 and 66 in a guide cage 68. Each of the stems 60 and 62 are encircled by compressed coil springs 70 and 72 between sliding guide rings 74 and fixed retainer rings 76 to bias the stems 60 and 62 against a retaining plate 78 to move the plate 78 against a retainer wall 80 which is pre-positioned in accordance with the desired movement of the stems 60 and 62 and the respective coil wipers 56 and 58 in a direction towards said wall 80. The pre-positioning of the wall 80 is such that the respective flights 82 and 84 of coil wipers 56 and 58 are shifted to the left as viewed in FIG. 6 by springs 70 and 72 to meet the rear faces of the flights of the respective adjacent conveyor screws (not shown) without exerting any force thereon that might cause wear.

The retainer plate 80 is connected by push rods 86 and 88 extending through bores 90 in a guide frame 92 to a prepositioned drive plate 94 which is moved at predetermined speeds and intervals either manually or by suitable drive means 96 such as a pneumatic motor shown herein as a box shape connected to the drive plate by a pivotable linkage 98. The drive plate 94 is pre-positioned to move the retainer plate 80 and stems 60 and 62 to the right as shown in FIG. 6 against the biasing forces of springs 70 and 72 which in turn shifts the respective flights 82 and 84 of the coil wipers 56 and 58 along the troughs of the respective adjacent conveyor screws (not shown) between the flights to the front face of the adjacent flight without exerting any force thereon which might cause wear, but still sufficient to clean the entire trough during this shifting. The coil springs 70 and 72 and or the drive means 96 returns the coil wipers along the respective troughs to again clean between adjacent flights of the screws. Between the operation of the drive means 96 and the return biasing forces of the coil springs 70 and 72 a reciprocating motion of the coil wipers is maintained to continually clean the entire troughs of conveying screws as desired.

Although I have shown and described only a few embodiments of the present invention, other embodiments may be comprised of different arrangements of intermeshing of coil wipers and conveyor screws or mixers with various driving means for reciprocating the different coil wiper flights between the conveyor screw flights without departing from the spirit and scope thereof, it is intended that all matter contained in the foregoing description as shown in the accompanying drawings shall be interpreted as illustrative and not in a limiting sense.

What is claimed is:

1. A screw conveyor assembly comprising: rotatable screw conveyor means having helical flight portions; coil means rotatable about an axis parallel to the axis of rotation of said conveyor means, said coil means having coil flight portions being mounted with circles of revolution of said coil flight portions overlapping said helical flight portions so as to pass therebetween upon mutual rotation thereof; and means for axially reciprocating said coil flights relative to said helical flights.

2. A screw conveyor assembly as specified in claim 1 wherein said means for axially reciprocating includes a manually operated linkage means.

3. A screw conveyor assembly as specified in claim 1 wherein said means for axially reciprocating includes a motor operated reciprocating linkage means.

4. A screw conveyor assembly as specified in claim 1 wherein said means for axially reciprocating includes a linkage means movable in one direction parallel to the said axis of said conveyor means responsive to operation of a drive motor means, and movable in an opposite direction responsive to a spring biasing means.

5. A screw conveyor assembly as specified in claim 1 wherein said coil means includes a coil and a rotatable axial shaft means coaxially located within said coil.

6. A screw conveyor assembly as specified in claim 5 wherein said axial shaft means is secured to said coil and axially movable parallel to said conveyor means.

7. A screw conveyor assembly as specified in claim 1 wherein said coil means includes a plurality of parallel rotatable shaft means each coaxially located within and secured to separate sets of said coil flight portions.

8. A screw conveyor assembly as specified in claim 7 wherein said separate sets of coil flight portions intermesh with each other.

9. A screw conveyor assembly as specified in claim 8 wherein said separate sets of coil flight portions intermesh with said helical flight portions of said conveyor means.

10. A screw conveyor assembly as specified in claim 9 wherein said shaft means and said separate sets of coil flight portions are movable along the axis thereof parallel to the axis of the conveyor means.

* * * * *

UNITED STATES PATENT OFFICE
CERTIFICATE OF CORRECTION

Patent No. 3,782,535                    Dated January 1, 1974

Inventor(s) Thomas Yousch

It is certified that error appears in the above-identified patent and that said Letters Patent are hereby corrected as shown below:

Claim 1, line 8 delete "flights" and substitute
-- flight portions --;

line 9 delete "flights" and substitute
-- flight portions --;

Signed and sealed this 16th day of April 1974.

(SEAL)
Attest:

EDWARD M. FLETCHER, JR.                 C. MARSHALL DANN
Attesting Officer                       Commissioner of Patents